(12) United States Patent
Fujii et al.

(10) Patent No.: US 7,075,274 B2
(45) Date of Patent: Jul. 11, 2006

(54) REACTIVE POWER COMPENSATOR

(75) Inventors: Toshiyuki Fujii, Tokyo (JP); Naoki Morishima, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 11/050,026

(22) Filed: Feb. 4, 2005

(65) Prior Publication Data
US 2006/0043941 A1    Mar. 2, 2006

(30) Foreign Application Priority Data
Aug. 27, 2004   (JP)  ............................ 2004-248349

(51) Int. Cl.
*G05F 1/70* (2006.01)
(52) U.S. Cl. ........................ 323/207; 363/46
(58) Field of Classification Search ................ 323/207; 363/44, 45, 46
See application file for complete search history.

(56) References Cited

U.S. PATENT DOCUMENTS 5,513,090 A * 4/1996 Bhattacharya et al. ........ 363/40
6,573,690 B1   6/2003 Ogusa et al.

FOREIGN PATENT DOCUMENTS

JP       2000-83386       3/2000

* cited by examiner

*Primary Examiner*—Shawn Riley
(74) *Attorney, Agent, or Firm*—Leydig, Voit & Mayer, Ltd.

(57) ABSTRACT

A reactive power compensator continues operation even when a higher harmonic wave component of an alternating-current power system increases. For an alternating current electric amount indicating one of an alternating voltage and an alternating electric current in an alternating-current power system, the reactive power compensator outputs a changing amount showing a change of the alternating current electric amount. An electric current command limits an electric current command signal based on the changing amount. For example, the changing amount is changed in accordance with the higher harmonic wave component included in the alternating current electric amount.

13 Claims, 6 Drawing Sheets

REACTIVE POWER COMPENSATOR

BACKGROUND OF THE INVENTION

1. Field of the Invention

The present invention relates to a reactive power compensator for compensating reactive power by injecting a reactive current into an alternating-current power system.

2. Background Art

In an alternating-current power transmitting system using a power transmission line or a power transmission cable, reactive power is increased and the alternating voltage tends to be changed when power transmission distance is increased or the electric power transmitted is increased due to the influence of impedance and earth capacitance of the power transmission line or the power transmission cable. This change of the alternating voltage becomes a factor for destabilizing the operation of the power transmission system. Various kinds of reactive power compensators for injecting reactive current into the alternating-current power system are used to solve this destabilization of this alternating-current power transmitting system.

As this reactive power compensator, a type of the reactive power compensator for converting the direct current voltage of a direct current power source circuit into an alternating voltage by using an electric power converting circuit of an electric current control type using a switching element and supplying this alternating voltage to the alternating-current power system is proposed in e.g., JP-A-2000-83386. Since the reactive power compensator of this type has high control performance, the reactive power compensator of this type can also restrain the change of a transient alternating voltage based on the change of the reactive power induced when an accident is occurred in the alternating-current power system as well as stationary reactive-power compensation. Accordingly, the reactive power compensator of this type can contribute to the stabilization of the alternating-current power system.

The reactive power compensator shown in FIG. 1 of JP-A-2000-83386 has a control command means for outputting an alternating voltage command signal with respect to the electric power converting circuit, and an alternating voltage control means for controlling the operation of a switching element of the above electric power converting circuit in accordance with the above alternating voltage command signal. The above control command means generates an electric current detecting signal by an alternating voltage detecting signal showing the alternating voltage in the alternating-current power system, and an alternating electric current detecting signal showing the alternating electric current in the alternating-current power system. The above control command means also generates an alternating voltage command signal by comparing this electric current detecting signal with an electric current command signal. This alternating voltage command signal is given to the alternating voltage control means. This alternating voltage control means controls on-off timing of the switching element of the electric power converting circuit, and controls the above electric current detecting signal so as to be conformed to the above electric current command signal.

[Patent literature 1] JP-A-2000-83386, particularly, FIG. 1 and its explanation

In the reactive power compensator shown in the above related art, ability able to conform the above electric current detecting signal to the above electric current command signal by the above control command means depends on a control loop gain of a control circuit including the above control command means and the above alternating voltage control means, and the number of control times of the on-off timing of the switching element of the above electric power converting circuit. As the number of control times of the on-off timing of the above switching element is increased, the deviation between the above electric current detecting signal and the above electric current command signal can be reduced. Further, as the control loop gain of the above control circuit is raised, the deviation between the above electric current detecting signal and the above electric current command signal can be reduced in a wider frequency range.

However, when the number of control times of the on-off timing of the above switching element is increased, electric power loss in the switching element is increased and efficiency of the electric power converting circuit is reduced so that economical loss is increased. The number of control times of the on-off timing of the switching element is limited and operated to restrain the increase of this loss such that response characteristics of the above control circuit become a required minimum value.

On the other hand, resonance depending on a higher harmonic wave vibration from a higher harmonic wave generating source and frequency characteristics of impedance exists in the alternating-current power system. Accordingly, a higher harmonic wave voltage based on the higher harmonic wave vibration and the resonance is also applied to the electric power converting circuit, and a higher harmonic wave electric current based on these is flowed. When the number of control times of the on-off timing of the above switching element is increased, the deviation between the above electric current detecting signal and the above electric current command signal can be also reduced with respect to the higher harmonic wave voltage and the higher harmonic wave electric current. However, as mentioned above, when the number of control times of the on-off timing of the switching element is limited to restrain the increase of the loss, it is impossible to cope with the higher harmonic wave voltage and the higher harmonic wave electric current. There is also a danger that an excessive higher harmonic wave electric current is flowed to the electric power converting circuit. When the electric current flowed to the switching element exceeds its controllable range due to this excessive higher harmonic wave electric current, a protecting operation for stopping the on-off control of the switching element is performed to prevent damage of the device and a reactive power compensating function is also stopped.

Thus, in the conventional reactive power compensator shown in the above related art, a problem exists in that the electric current flowed to the switching element exceeds its controllable range and the reactive power compensating function is stopped due to the higher harmonic wave voltage and the higher harmonic wave electric current of the alternating-current power system.

SUMMARY OF THE INVENTION

This invention solves this problem and proposes a reactive power compensator improved so as not to stop the reactive power compensating function by the higher harmonic wave voltage and the higher harmonic wave electric current of the alternating-current power system.

A reactive power compensator according to the invention comprises an electric power conversion circuit, alternating voltage detecting means, alternating electric current detecting means, control command means and alternating voltage control means. The electric power converting circuit is connected to an alternating-current power system and a direct current power source circuit and converts a direct current voltage from the direct current power source circuit to an alternating voltage by a switching element and supplies the alternating voltage to the alternating-current power system. The alternating voltage detecting means outputs an alternating voltage detecting signal representing the alternating voltage in the alternating-current power system. The alternating electric current detecting means outputs an alternating electric current detecting signal representing an alternating electric current in the alternating-current power system. The control command means receives an electric current command signal and outputs an alternating voltage command signal in accordance with the electric current command signal, the alternating voltage detecting signal and the alternating electric current detecting signal. The alternating voltage control means controls the operation of the switching element of the electric power converting circuit in accordance with the alternating voltage command signal.

The reactive power compensator further comprises changing amount detecting means and limiting means. The changing amount detecting means outputs a changing amount representing the change of an alternating current electric amount of one of the alternating voltage and the alternating electric current in the alternating-current power system on the basis of the alternating current electric amount. The limiting means limits the electric current command signal, and the limiting means limits the electric current command signal on the basis of the changing amount.

On the basis of the alternating current electric amount representing one of the alternating voltage and the alternating electric current in the alternating-current power system, the reactive power compensator of this invention has the changing amount detecting means for outputting the changing amount representing the change of the alternating current electric amount, and the limiting means for limiting the electric current command signal. The limiting means limits the electric current command signal on the basis of the changing amount. Accordingly, even when the higher harmonic wave electric current is flowed to the electric power converting circuit by the higher harmonic wave voltage and the higher harmonic wave electric current of the alternating-current power system, the reactive power compensator can be continuously operated without stopping the reactive power compensating function.

DESCRIPTION OF THE PREFERRED EMBODIMENTS

Some embodiments of this invention will next be explained with reference to the drawings.

Embodiment 1

Figure 1:
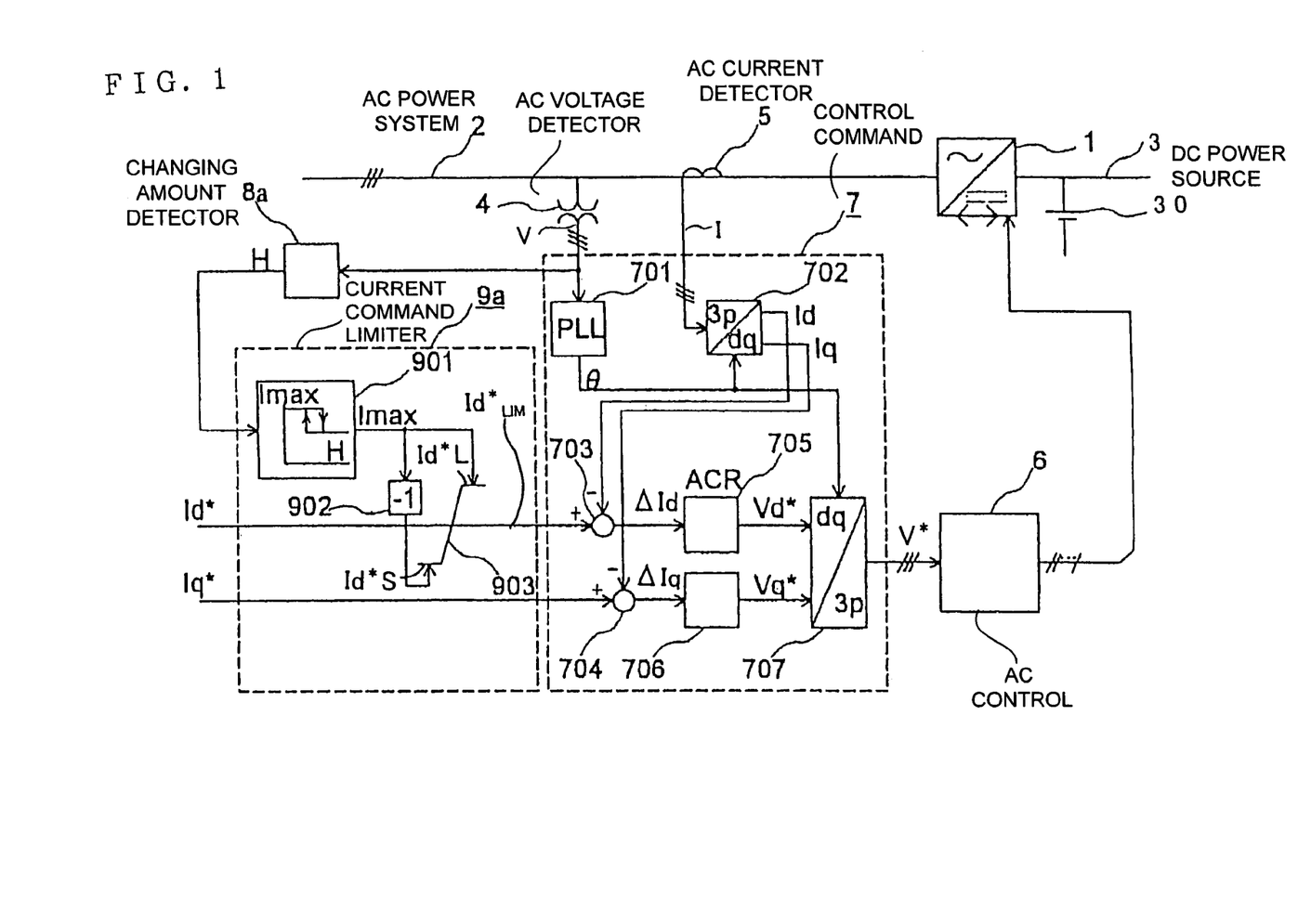
FIG. 1 is a block diagram showing an embodiment 1 of a reactive power compensator in this invention.
Figure 2:
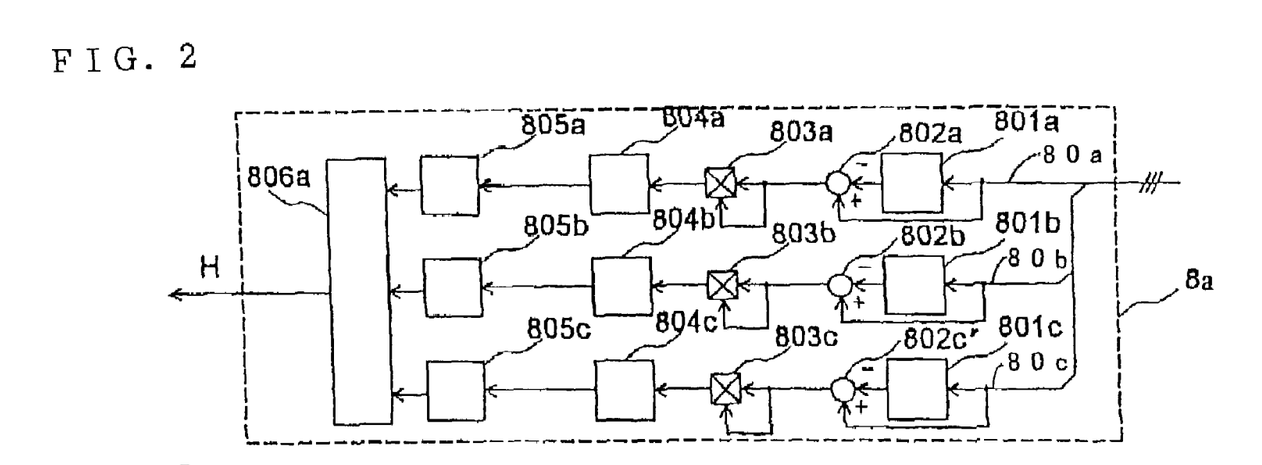
FIG. 2 is a block diagram showing the details of a changing amount detecting means used in the embodiment 1.

FIG. 1 is a block diagram showing an embodiment 1 of a reactive power compensator in this invention. FIG. 2 is a block diagram showing the details of a converting amount output means in FIG. 1.

The reactive power compensator of the embodiment 1 includes an electric power converting circuit 1, an alternating voltage detecting means 4, an alternating electric current detecting means 5, an alternating voltage control means 6, a control command means 7, a changing amount detecting means 8a and an electric current command limiting means 9a.

The electric power converting circuit 1 is arranged between an alternating-current power system 2 and a direct current power source circuit 3, and is connected to the alternating-current power system 2 and the direct current power source circuit 3. For example, the alternating-current power system 2 is constructed as an alternating-current power system of three phases, and has the three phases of A-phase, B-phase and C-phase. The direct current power source circuit 3 includes a direct current power source 30. The electric power converting circuit 1 converts the direct current voltage from the direct current power source 30 to a three-phase alternating voltage, and supplies this converted three-phase alternating voltage to the alternating-current power system 2, and compensates reactive power with respect to the alternating-current power system 2.

The electric power converting circuit 1 converts the direct current voltage to the three-phase alternating voltage by using plural power switching elements. Since the electric power converting circuit of this kind is publicly known, its detailed explanation is omitted here. However, the plural power switching elements are arranged in the respective phases of the A-phase, the B-phase and the C-phase. The direct current voltage of the direct current power source 30 is held approximately to a constant voltage. The power switching elements arranged in the respective phases are turned on and off in respective controllable timings, and the direct current voltage from the direct current power source 30 is modulated in pulse width and the three-phase-alternating voltage is generated. A three-phase alternating electric current according to the three-phase alternating voltage of the alternating-current power system 2, the impedance of the alternating-current power system 2 and the three-phase alternating voltage from the electric power converting circuit 1 is flowed to the alternating-current power system 2.

Each of the plural power switching elements has a control terminal and is turned on and off in controllable timing by a control pulse to this control terminal. A power semiconductor element such as a power transistor or a thyristor, etc. is used in the power switching element. The base of the power transistor is a control terminal, and this power transistor is turned on and off by a control pulse to its base. When the thyristor is used, its gate is a control terminal and the thyristor is turned on and off by a control pulse to its gate. If a gate turn-off thyristor is used as the thyristor, the thyristor can be turned on and off in controllable timing by the control pulse to the gate.

The alternating voltage detecting means 4 is connected to the alternating-current power system 2, and detects its three-phase alternating voltage and outputs an alternating voltage detecting signal V of three phases showing this three-phase alternating voltage. For example, a voltage transformer called PT is used for this alternating voltage detecting means 4. Concretely, the alternating voltage detecting means 4 has three voltage transformers respectively arranged in the A-phase, the B-phase and the C-phase of the alternating-current power system 2, and outputs an alternating voltage detecting signal V of three phases representing the three-phase alternating voltage of the alternating-current power system 2.

The alternating electric current detecting means 5 is coupled to the alternating-current power system 2, and detects its three-phase alternating electric current and outputs an alternating electric current detecting signal I of three phases representing this three-phase alternating electric current. For example, this alternating electric current detecting means 5 is constructed by using an electric current transformer called CT. Concretely, the alternating electric current detecting means 5 has three electric current transformers respectively coupled to the A-phase, the B-phase and the C-phase of the alternating-current power system 2, and outputs the alternating electric current detecting signal I of three phases representing the three-phase alternating electric current of the alternating-current power system 2.

The alternating voltage control means 6 controls on-timing and off-timing of each power switching element of the electric power converting circuit 1, and also controls the phase of the three-phase alternating voltage supplied from the electric power converting circuit 1 to the alternating-current power system 2. Since this alternating voltage control means 6 is also publicly known, its detailed explanation is omitted here. However, the alternating voltage control means 6 supplies a control pulse to the control terminal of each power switching element of the electric power converting circuit 1, and controls the on-timing and the off-timing of each power switching element by this control pulse. The alternating voltage control means 6 receives an alternating voltage command signal V* of three phases from the control command means 7, and supplies the control pulse to the control terminal of the power switching element of each phase of the electric power converting circuit 1 on the basis of this alternating voltage command signal V* of three phases.

The control command means 7 has a phase detecting means 701, a coordinate converting means 702, subtracting means 703, 704, amplifying means 705, 706 and a coordinate converting means 707. The phase detecting means 701 receives the alternating voltage detecting signal V of three phases from the alternating voltage detecting means 4, and generates a reference phase signal θ synchronized with an alternating voltage detecting signal Va of one of the three phases, e.g., the A-phase. For example, a phase synchronous loop (PLL) is used in this phase detecting means 701.

The coordinate converting means 702 receives the alternating electric current detecting signal I of three phases from the alternating electric current detecting means 5 and a reference phase signal θ from the phase detecting means 701, and generates an active current detecting signal Iq and a reactive current detecting signal Id. Concretely, the coordinate converting means 702 first converts the alternating electric current detecting signal I of three phases into a two-phase signal and further generates the active current detecting signal Iq and the reactive current detecting signal Id by converting this two-phase signal with respect to rotating coordinates. The active current detecting signal Iq shows an active component of the same phase as the reference phase signal θ. The reactive current detecting signal Id shows a reactive component in a phase separated by 90 degrees from that of the reference phase signal θ.

A reactive current command limit signal $Id^*_{LIM}$ given from the electric current command limiting means 9a and the reactive current detecting signal Id from the coordinate converting means 702 are inputted to the subtracting means 703. This subtracting means 703 outputs a reactive current deviation signal ΔId provided by subtracting the reactive current detecting signal Id from the reactive current command limit signal $Id^*_{LIM}$. An active current command signal Iq* given from the exterior and the active current detecting signal Iq from the coordinate converting means 702 are inputted to the subtracting means 704. This subtracting means 704 outputs an active current deviation signal ΔIq provided by subtracting the active current detecting signal Iq from the active current command signal Iq*.

The amplifying means 705 amplifies the reactive current deviation signal ΔId from the subtracting means 703 and outputs a reactive voltage command signal Vd* to the coordinate converting means 707. The amplifying means 706 amplifies the active current deviation signal ΔIq from the subtracting means 704 and outputs an active voltage command signal Vq* to the coordinate converting means 707. The coordinate converting means 707 outputs the alternating voltage command signal V* of three phases to the alternating voltage control means 6 on the basis of the active voltage command signal Vq* and the reactive voltage command signal Vd*. The alternating voltage control means 6 controls the on-timing and the off-timing of each power switching element of the electric power converting circuit 1 so as to set the active current deviation signal ΔIq and the reactive current deviation signal ΔId to a minimum value, e.g., 0.

The changing amount detecting means 8a outputs a changing amount H representing the change of an alternating current electric amount in the alternating-current power system 2. In the embodiment 1, the alternating voltage detecting signal V of three phases from the alternating voltage detecting means 4 is inputted to this changing amount detecting means 8a. Accordingly, the changing amount detecting means 8a outputs the changing amount of the three-phase alternating voltage in the alternating-current power system 2 on the basis of the alternating voltage detecting signal V of three phases. Concretely, the changing amount detecting means 8a is constructed so as to output the changing amount H representing the change of a higher harmonic wave component included in the three-phase alternating voltage in the alternating-current power system 2 on the basis of this alternating voltage detecting signal V of three phases.

The reactive current command signal Id* and the active current command signal Iq* are given from the exterior to the electric current command limiting means 9a. The electric current command limiting means 9a generates a reactive current command limit signal $Id^*_{LIM}$ for limiting the reactive current command signal Id* and outputs this reactive current command limit signal $Id^*_{LIM}$ to the subtracting means 703 of the control command means 7. The electric current command limiting means 9a does not impose a limit with respect to the active current command signal Iq*, and the active current command signal Iq* is given to the subtracting means 704 as it is.

The electric current command limiting means 9a has a hysteresis comparator 901, a multiplying means 902 and a limiting means 903 with respect to the reactive current command signal Id*. The hysteresis comparator 901 receives the changing amount H from the changing amount detecting means 8a and compares this changing amount H with a comparison value. This comparison value is switched to a first comparison value C1 and a second comparison value C2. The first comparison value C1 is greater than the second comparison value C2 and the relation of C1>C2 is set. An output $I_{max}$ of the hysteresis comparator 901 is switched to a first output value $I_{max}1$ and a second output value $I_{max}2$. The first output value $I_{max}1$ is greater than the second output value $I_{max}2$ and $I_{max}1 > I_{max}2$ is set.

If this changing amount H is smaller than the first comparison value C1 even when the higher harmonic wave component included in the alternating voltage in the alternating-current power system 2 is changed, the output $I_{max}$ of the hysteresis comparator 901 is held to the first output value $I_{max}1$. When the changing amount H is increased and exceeds the first comparison value C1, the output $I_{max}$ of the hysteresis comparator 901 is switched from the first output value $I_{max}1$ to the second output value $I_{max}2$ and its comparison value is also switched from the first comparison value C1 to the second comparison value C2.

Thereafter, if the changing amount H is greater than the second comparison value C2 when this changing amount H is reduced, the output $I_{max}$ of the hysteresis comparator 901 is held to the second output value $I_{max}2$. When the changing amount H is reduced and becomes smaller than the second comparison value C2, the output $I_{max}$ of the hysteresis comparator 901 is switched from the second output value $I_{max}2$ to the first output value $I_{max}1$, and its comparison value is also switched at the same time from the second comparison value C2 to the first comparison value C1.

If the output $I_{max}$ of the hysteresis comparator 901 is the first output value $I_{max}1$ the limiting means 903 limits the reactive current command limit signal $Id*_{LIM}$ for limiting the reactive current command signal Id* to an upper limit value Id*L. If the output $I_{max}$ of the hysteresis comparator 901 is the second output value $I_{max}2$, the multiplying means 902 multiplies this second output value $I_{max}2$ by (−1). The limiting means 903 limits the reactive current command limit signal $Id*_{LIM}$ to a lower limit value Id*S. The upper limit value Id*L is set to be greater than the lower limit value Id*S, and Id*L>Id*S is set.

The changing amount H outputted from the changing amount detecting means 8a represents the change of a higher harmonic wave component included in the three-phase alternating voltage in the alternating-current power system 2, and has a magnitude proportional to this higher harmonic wave component. In a state in which this changing amount H is small, the hysteresis comparator 901 outputs the first output value $I_{max}1$. In this state, the limiting means 903 limits the reactive current command limit signal $Id*_{LIM}$ to the upper limit value Id*L. The control command means 7 sets a reactive current deviation signal ΔId provided by subtracting the reactive current detecting signal Id from this upper limit value Id*L to a minimum value, and the electric power converting circuit 1 controls an active current deviation signal ΔIq provided by subtracting the active current detecting signal Iq from the active current command signal Iq* so as to be a minimum value.

When the higher harmonic wave component included in the three-phase alternating voltage in the alternating-current power system 2 is increased, the changing amount H is increased. As this changing amount H is increased, the output $I_{max}$ of the hysteresis comparator 901 is reduced from the first output value $I_{max}$ to the second output value $I_{max}2$.

In this state, the limiting means 903 limits the reactive current command limit signal Id* to the lower limit value Id*S. In this case, the alternating voltage command signal V* from the coordinate converting means 707 of the control command means 7 controls the reactive current detecting signal Id toward the lower limit value Id*S, and also controls the active current detecting signal Iq toward the active current command value Iq*. As a result, the alternating voltage supplied from the electric power converting circuit 1 to the alternating-current power system 2 is limited by the lower limit value Id*S and the active current command signal Iq*.

Thereafter, when the higher harmonic wave component included in the three-phase alternating voltage in the alternating-current power system 2 is reduced, the changing amount H is reduced. As this changing amount H is reduced, the output $I_{max}$ of the hysteresis comparator 901 is returned from the second output value $I_{max}2$ to the first output value $I_{max}1$, and the limiting means 903 limits the reactive current command signal Id* to the upper limit value Id*L. In this case, the alternating voltage command value V* from the coordinate converting means 707 of the control command means 7 controls the reactive current detecting value Id toward the upper limit value Id*L, and also controls the active current detecting value Iq toward the active current command value Iq*. Accordingly, the alternating voltage supplied from the electric power converting circuit 1 to the alternating-current power system 2 is again limited by the upper limit value Id*L.

FIG. 2 is a block diagram showing the details of the changing amount detecting means 8a. The changing amount detecting means 8a receives the alternating voltage detecting signal V of three phases from the voltage detecting means 4, and outputs the changing amount H having the magnitude proportional to the higher harmonic wave component included in this alternating voltage detecting signal V. The changing amount detecting means 8a includes detecting circuits 80a, 80b, 80c with respect to alternating voltage detecting signals Va, Vb, Vc of the respective three phases, and a maximum value selecting means 806a.

The detecting circuit 80a includes a band-pass filter 801a, a subtracting means 802a, a multiplying means 803a, a low-pass filter 804a and a square root arithmetic means 805a. Similarly, the detecting circuit 80b includes a band-pass filter 801b, a subtracting means 802b, a multiplying means 803b, a low-pass filter 804b and a square root arithmetic means 805b. Further, the detecting circuit 80c includes a band-pass filter 801c, a subtracting means 802c, a multiplying means 803c, a low-pass filter 804c and a square root arithmetic means 805c. In this embodiment mode 1, the band-pass filters 801a, 801b and 801c are constructed so as to pass the alternating voltage having a frequency near fundamental wave frequencies of the alternating voltage detecting signals Va, Vb, Vc, and pass the fundamental wave components of the alternating voltage detecting signals Va, Vb, Vc.

The subtracting means 802a, 802b, 802c respectively subtract the outputs of the band-pass filters 801a, 801b, 801c, i.e., the fundamental wave components of the alternating voltage detecting signals Va, Vb, Vc from the alternating voltage detecting signals Va, Vb, Vc, and output only the higher harmonic wave components included in the alternating voltage detecting signals Va, Vb, Vc.

The higher harmonic wave components outputted from these subtracting means 802a, 802b, 802c are respectively squared by the multiplying means 803a, 803b, 803c, and their low frequency components pass through the low-pass filters 804*a*, 804*b*, 804*c* and are then square-root-calculated by the square root arithmetic means 805*a*, 805*b*, 805*c* and are supplied to the maximum value selecting means 806*a*. The square root arithmetic means 805*a*, 805*b*, 805*c* respectively calculate effective values of the higher harmonic wave components passing through the low-pass filters 804*a*, 804*b*, 804*c*. Accordingly, the maximum value selecting means 806*a* selects a maximum value among the effective values of the higher harmonic wave components outputted from the square root arithmetic means 805*a*, 805*b*, 805*c*, and outputs this maximum value as the changing amount H. As a result, this changing amount H has a magnitude proportional to the maximum value among the effective values of the higher harmonic wave components included in the alternating voltage detecting signals Va, Vb, Vc.

As mentioned above, in the embodiment 1, the changing amount H has the magnitude proportional to the maximum value of the effective value of the higher harmonic wave component included in the three-phase alternating voltage in the alternating-current power system 2, and the limit value of the reactive current command limit signal Id*$_{LIM}$ is changed by the limiting means 903 in accordance with the magnitude of this changing amount H. When this changing amount H is increased, the reactive current command limit signal Id*$_{LIM}$ is limited to the second limit value Id*S. Accordingly, even when the higher harmonic wave electric current is flowed to the electric power converting circuit by the higher harmonic wave voltage and the higher harmonic wave electric current of the alternating-current power system, the operation of the electric power converting circuit 1 is continued and the reactive power compensating function can be continued.

In the embodiment 1, the three-phase alternating voltage detecting signal V from the alternating voltage detecting means 4 is supplied to the band-pass filters 801*a*, 801*b*, 801*c*. However, the same operations and effects as the embodiment 1 can be also obtained even when the three-phase alternating electric current detecting signal I from the alternating electric current detecting means 5 is supplied to each of three resistors having the same resistance value and voltage signals obtained from these three resistors are supplied to the band-pass filters 801*a*, 801*b*, 801*c*.

Embodiment 2

Figure 3:
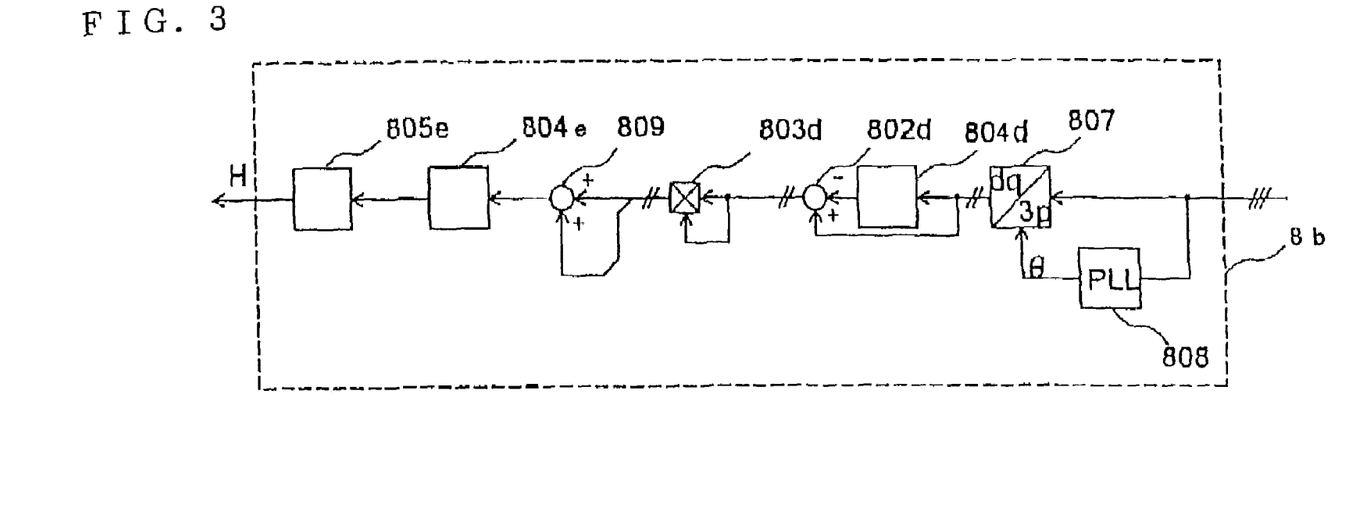
FIG. 3 is a block diagram showing the details of a changing amount detecting means used in an embodiment 2 of the reactive power compensator in this invention.

FIG. 3 is a block diagram showing a changing amount detecting means 8*b* used in an embodiment 2 of the reactive power compensator in this invention. In this embodiment 2, the changing amount detecting means 8*b* shown in FIG. 3 is used instead of the changing amount detecting means 8*a* used in the embodiment 1. The other constructions are same as those of the embodiment 1.

The changing amount detecting means 8*b* shown in FIG. 3 has a coordinate converting means 807, a phase detecting means 808, a low-pass filter 804*d*, a subtracting means 802*d*, a multiplying means 803*d*, an adding means 809, a low-pass filter 804*e* and a square root arithmetic means 805*e*. In this changing amount detecting means 8*b*, the low-pass filter 804*d* is constructed so as to pass only a direct current component included in an alternate current components of orthogonal axes outputted from the coordinate converting means 807.

The three-phase alternating voltage detecting signal V from the alternating voltage detecting means 4 is inputted to the coordinate converting means 807 and the phase detecting means 808. This three-phase alternating voltage detecting signal V includes the alternating voltage detecting signals Va, Vb, Vc of the respective phases. For example, the phase detecting means 808 generates a reference phase signal θ synchronized with the alternating voltage detecting signal Va of the A-phase among the three-phase alternating voltage detecting signal V, and supplies this reference phase signal θ to the coordinate converting means 807. The coordinate converting means 807 converts the three-phase alternating voltage detecting signal V into an amplitude component of the orthogonal axes by using the reference phase signal θ.

The alternate current components of the orthogonal axes from the coordinate converting means 807 becomes an unchanged direct current component when no alternating voltage detecting signal V includes the higher harmonic wave. However, when the higher harmonic wave is included in the alternating voltage detecting signal V, a changing component is superposed on the direct current component. The alternate current components of the orthogonal axes from this coordinate converting means 807 is supplied to the low-pass filter 804*d* and the subtracting means 802*d*. The low-pass filter 804*d* passes only the direct current component included in the alternate current components of the orthogonal axes from the coordinate converting means 807. The subtracting means 802*d* subtracts the direct current component passing through the low-pass filter 804*d* from the alternate current components of the orthogonal axes from the coordinate converting means 807, and outputs the changing component included in the alternate current components of the orthogonal axes. This changing component has a magnitude proportional to the higher harmonic wave component included in the alternating voltage detecting signal V.

The multiplying means 803*d* squares the changing component included in the alternate current components of the orthogonal axes, and its square output is added by the adding means 809. The adding output of the adding means 809 is supplied to the low-pass filter 804*e*, and the square root of a low frequency component passing through this low-pass filter 804*e* is calculated by the square root arithmetic means 805*e*, and the effective value of the changing component is outputted as the changing amount H.

In this embodiment 2, the changing amount H also has a magnitude proportional to the effective value of the higher harmonic wave component included in the three-phase alternating voltage in the alternating-current power system 2, and the limit value of the reactive current command limit signal Id*$_{LIM}$ is changed in accordance with this changing amount H. When this changing amount H is increased, the reactive current command limit signal Id*$_{LIM}$ is limited to the lower limit value Id*S. Accordingly, the electric power converting circuit 1 is continuously operated and the reactive power compensating function can be continued even when the higher harmonic wave electric current is flowed to the electric power converting circuit by the higher harmonic wave voltage and the higher harmonic wave electric current of the alternating-current power system.

In the embodiment 2, the three-phase alternating voltage detecting signal V from the alternating voltage detecting means 4 is also supplied to the coordinate converting means 807 and the phase detecting means 808. However, the same operations and effects as the embodiment 2 can be also obtained even when the three-phase alternating electric current detecting signal I from the alternating electric current detecting means 5 is supplied to each of three resistors having the same resistance value, and voltage signals obtained from these three resistors are supplied to the coordinate converting means 807 and the phase detecting means 808.

Embodiment 3

Figure 4:
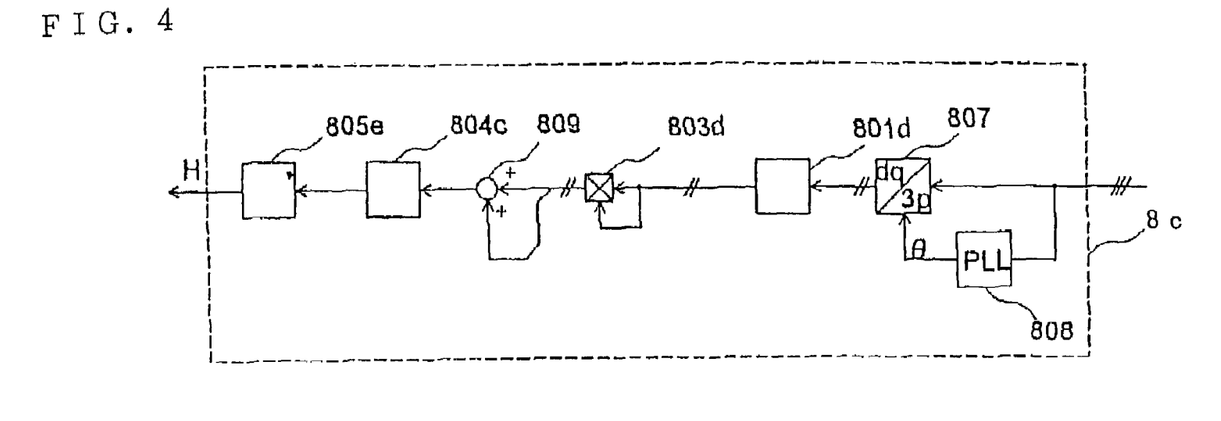
FIG. 4 is a block diagram showing the details of a changing amount detecting means used in an embodiment 3 of the reactive power compensator in this invention.

FIG. 4 is a block diagram showing a changing amount detecting means 8c used in an embodiment 3 of the reactive power compensator in this invention. In this embodiment 3, the changing amount detecting means 8c shown in FIG. 3 is used instead of the changing amount detecting means 8a used in the embodiment 1. The other constructions are same as those of the embodiment 1.

In the changing amount detecting means 8c used in this embodiment 3, the low-pass filter 804d in the changing amount detecting means 8b used in the embodiment 2 is replaced with a band-pass filter 801d. The other constructions are same as those of the changing amount detecting means 8b shown in FIG. 3.

The band-pass filter 801d used in the changing amount detecting means 8c is connected between the coordinate converting means 807 and the multiplying means 803d. This band-pass filter 801d is constructed so as to receive an alternate current components of the orthogonal axes from the coordinate converting means 807 and pass the higher harmonic wave component of a specific frequency included in this alternate current components of the orthogonal axes.

The multiplying means 803d squares the higher harmonic wave component of the specific frequency passing through the band-pass filter 801d, and its square output is added by the adding means 809. The adding output of the adding means 809 is supplied to the low-pass filter 804e, and the square root of a low frequency component passing through this low-pass filter 804e is calculated by the square root arithmetic means 805e, and the effective value of the higher harmonic wave component of the specific frequency is outputted as the changing amount H.

In this embodiment 3, the changing amount H has a magnitude proportional to the higher harmonic wave component of the specific frequency included in the three-phase alternating voltage in the alternating-current power system 2, and the limit value of the reactive current command limit signal $Id^*_{LIM}$ is changed in accordance with this changing amount H. When the changing amount H is increased, the reactive current command limit signal $Id^*_{LIM}$ is limited to the lower limit value Id*S. Accordingly, the electric power converting circuit 1 is continuously operated and the reactive power compensating function can be continued even when the higher harmonic wave electric current is flowed to the electric power converting circuit by the higher harmonic wave voltage and the higher harmonic wave electric current of the alternating-current power system.

In the embodiment 3, since the changing amount H having the magnitude proportional to the higher harmonic wave component of the specific frequency is particularly detected, a condition for operating the electric power converting circuit by limiting the reactive current command limit signal $Id^*_{LIM}$ to the lower limit value Id*S is limited. The reactive current command limit signal $Id^*_{LIM}$ is limited to the lower limit value Id*S only when the higher harmonic wave component of the specific frequency becomes a predetermined value or more. Accordingly, the operation of the electric power converting circuit 1 can be continued by avoiding the limit of the reactive current command signal Id* as much as possible.

In the embodiment 3, the three-phase alternating voltage detecting signal V from the alternating voltage detecting means 4 is supplied to the coordinate converting means 807 and the phase detecting means 808. However, the same operations and effects as the embodiment 3 can be also obtained even when the three-phase alternating electric current detecting signal I from the alternating electric current detecting means 5 is supplied to each of three resistors having the same resistance value and voltage signals obtained from these three resistors are supplied to the coordinate converting means 807 and the phase detecting means 808.

Embodiment 4

In this embodiment 4, the band-pass filters 801a, 801b, 801c in the respective detecting circuits 80a, 80b, 80c and the subtracting means 802a, 802b, 802c in the changing amount detecting means 8a used in the embodiment 1 are replaced with the band-pass filter 801d used in the embodiment 3.

Concretely, in FIG. 2, the band-pass filter 801a included in the detecting circuit 80a and the subtracting means 802a are replaced with the band-pass filter 801d shown in FIG. 4. The band-pass filter 801b included in the detecting circuit 80b and the subtracting means 802b are replaced with the band-pass filter 801d shown in FIG. 4. The band-pass filter 801c included in the detecting circuit 80c and the subtracting means 802c are replaced with the band-pass filter 801d shown in FIG. 4.

In the embodiment 4, each band-pass filter 801d used in these detecting circuits 80a, 80b, 80c passes the higher harmonic wave component of a specific frequency similarly to the band-pass filter 801d in the embodiment 3. The higher harmonic wave components of the specific frequency passing through these respective band-pass filters 801d are respectively squared by multiplying means 803a, 803b, 803c in the respective detecting circuits 80a, 80b, 80c and pass through low-pass filters 804a, 804b, 804c. Thereafter, the square roots of the higher harmonic wave components are calculated by square root arithmetic means 805a, 805b, 805c, and a maximum value among these square roots is selected by a maximum value selecting means 806a and is outputted as the changing amount H.

In this embodiment 4, since the changing amount detecting means 8a detects the changing amount H having the magnitude proportional to the higher harmonic wave component of the specific frequency, a condition for operating the electric power converting circuit by limiting the reactive current command limit signal $Id^*_{LIM}$ to the lower limit value Id*S is limited. The reactive current command limit signal $Id^*_{LIM}$ is limited to the second limit value Id*S only when the higher harmonic wave component of the specific frequency becomes a predetermined value or more. Accordingly, the electric power converting circuit 1 can be operated by avoiding the limit of the reactive current command signal Id* as much as possible.

Embodiment 5

Figure 5:
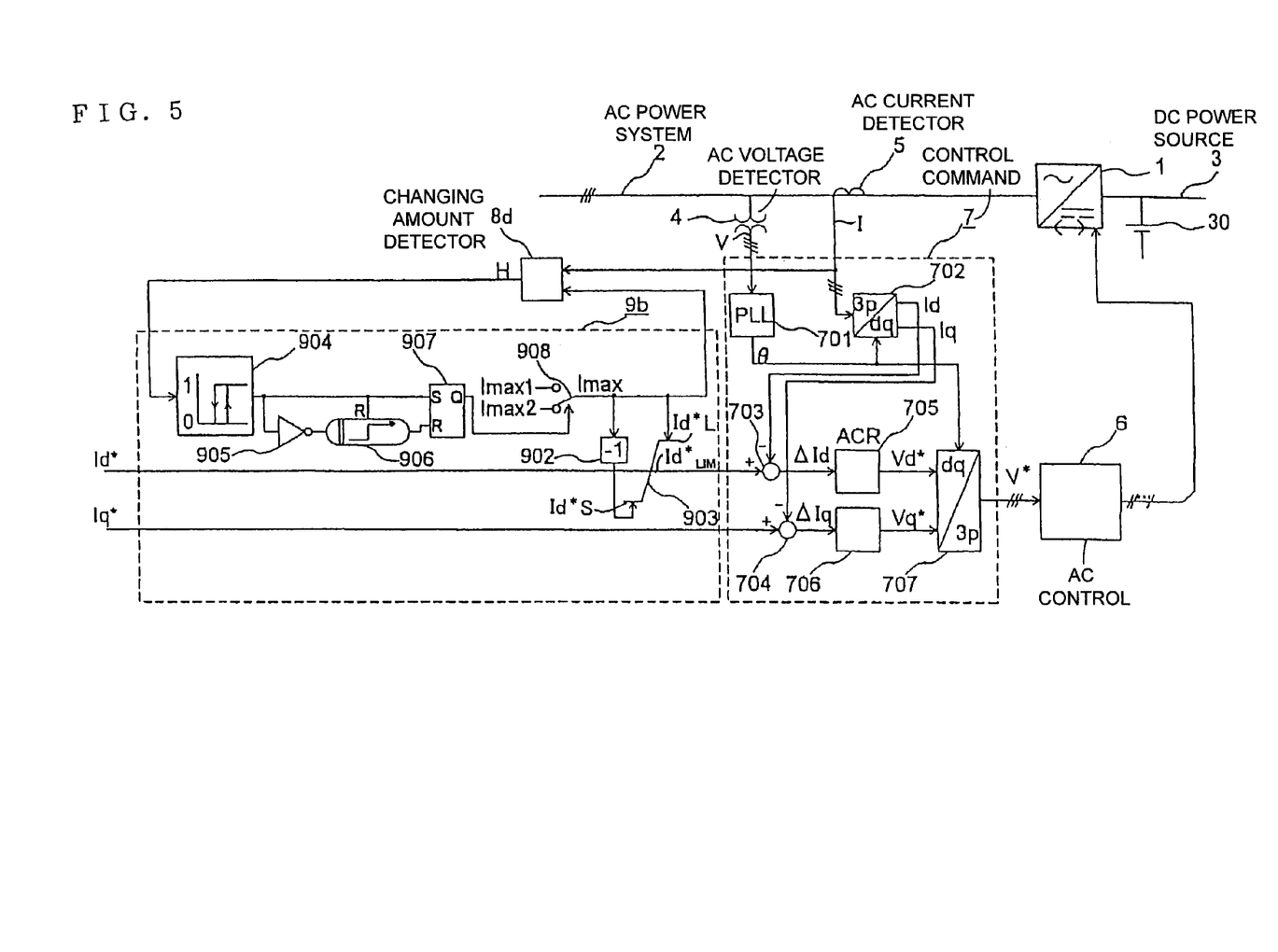
FIG. 5 is a block diagram showing an embodiment 5 of the reactive power compensator in this invention.
Figure 6:
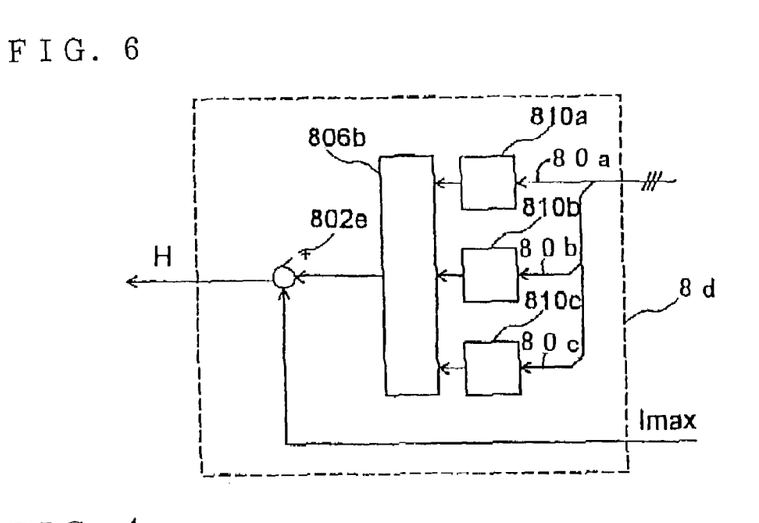
FIG. 6 is a block diagram showing the details of a changing amount detecting means used in the embodiment 5.

FIG. 5 is a block diagram showing an embodiment 5 of the reactive power compensator in this invention. FIG. 6 is a block diagram showing the details of a changing amount detecting means 8d used in this embodiment 5.

In this embodiment 5, the changing amount detecting means 8d is used instead of the changing amount detecting means 8a in the embodiment 1. Further, an electric current command limiting means 9b is used instead of the electric current command limiting means 9a. The other constructions are same as those of the embodiment 1.

As shown in FIG. 5, the electric current command limiting means 9b used in this embodiment 5 has a hysteresis comparator 904, a logic inverting means 905, an on-delay means 906, a flip flop 907, a switching means 908, a multiplying means 902 and a limiting means 903. The multiplying means 902 and the limiting means 903 use the same means as the multiplying means and the limiting means used in the embodiment 1.

The hysteresis comparator 904 receives the changing amount H from the changing amount detecting means 8d, and generates a logic output of a high level or a low level. Concretely, when the changing amount H is increased, the logic output is changed from the low level to the high level when the changing amount H exceeds a comparison value C3. Thereafter, when the changing amount H is reduced, the logic output is returned from the high level to the low level when the changing amount H is reduced to a comparison value C4 or less. The comparison value C3 is greater than the comparison value C4 and C3>C4 is set.

The flip flop 907 has a set input S, a reset input R and an output Q. The logic output of the hysteresis comparator 904 is directly given to the set input S. The logic output of the hysteresis comparator 904 is given to the reset input R through the logic inverting means 905 and the on-delay means 906. The logic inverting means 905 inverts the logic output of the hysteresis comparator 904 and supplies the inverted logic output to the on-delay means 906. When a high level output from the logic inverting means 905 is continued for a predetermined time D, the on-delay means 906 supplies the high level output to the reset input R.

The switching means 908 switches a limit output $I_{max}$ to one of $I_{max}1$ and $I_{max}2$. The flip flop 907 switches the switching means 908 from the output $I_{max}2$ to the output $I_{max}1$ when the output Q attains the high level. $I_{max}1$ is greater than $I_{max}2$ and $I_{max}1>I_{max}2$ is set. The limit output from the switching means 908 is given to the multiplying means 902 and the limiting means 903.

The electric current command limiting means 9b is operated as follows. First, in a state in which the changing amount H is smaller than the comparison value C3, the logic output of the hysteresis comparator 904 is at the low level and the output Q of the flip flop 907 is also at the low level. In this state, the switching means 908 selects and outputs the limit output $I_{max}2$ and this limit output $I_{max}2$ is given to the limiting means 903. The reactive current command limit signal $Id^*_{LIM}$ becomes the upper limit value $Id^*L$ and this upper limit value $Id^*L$ is supplied to the subtracting means 703 of the control command means 7.

When the changing amount H is increased and exceeds the comparison value C3, the logic output of the hysteresis comparator 904 is changed to the high level. Therefore, the set input S of the flip flop 907 becomes the high level and its output Q becomes the high level. As its result, the switching means 908 selects and outputs the limit output $I_{max}1$. The multiplying means 902 multiplies its limit output $I_{max}1$ by (−1). The limiting means 903 limits the reactive current command limit signal $Id^*_{LIM}$ to the lower limit value $Id^*S$, and this lower limit value $Id^*S$ is supplied to the subtracting means 703 of the control command means 7.

Thereafter, when the changing amount H is reduced, the logic output of the hysteresis comparator 904 is returned to the low level when the changing amount H is lowered and becomes smaller than the comparison value C4. The set input S of the flip flop 907 becomes the low level. When the logic output of the hysteresis comparator 904 is returned to the low level, the output of the logic inverting means 905 becomes the high level. When this state is continued for a predetermined time D, the reset input R of the flip flop 907 is changed to the high level and the output Q of the flip flop 907 is changed to the low level. When the output Q of the flip flop 907 becomes the low level, the switching means 908 outputs the limit output $I_{max}2$ and the limiting means 903 returns the reactive current command limit signal $Id^*_{LIM}$ to the upper limit value $Id^*L$.

The changing amount detecting means 8d in the embodiment 5 receives the three-phase alternating electric current detecting signal I from the alternating electric current detecting means 5 and the limit output $I_{max}$ from the electric current command limiting means 9b, and outputs the changing amount H. As shown in FIG. 6, this changing amount detecting means 8d has a subtracting means 802e, a maximum value selecting means 806b and absolute value arithmetic means 810a, 810b, 810c.

The absolute value arithmetic means 810a, 810b, 810c are arranged in respective detecting circuits 80a, 80b, 80c of three phases. The absolute value arithmetic means 810a, 810b, 810c respectively calculate the absolute values of alternating electric current detecting signals Ia, Ib, Ic of A-phase, B-phase and C-phase, and map negative side signals of the alternating electric current detecting signals Ia, Ib, Ic changed positively and negatively onto the positive side at the same time. The outputs of these absolute value arithmetic means 810a, 810b, 810c are instant value signals changed by only the positive side of the alternating electric current detecting signals Ia, Ib, Ic.

When the alternating electric current detecting signals Ia, Ib, Ic include a fundamental wave component and a higher harmonic wave component, these instant value signals show instant values of the alternating electric current detecting signals Ia, Ib, Ic in which the higher harmonic wave component is superposed on this fundamental wave component, and are signals changed in accordance with a peak value of the higher harmonic wave signal. The maximum value selecting means 806b selects and outputs a maximum value among the instant values of these alternating electric current detecting signals Ia, Ib, Ic.

The subtracting means 802e subtracts the limit output $I_{max}$ from the output of the maximum value selecting means 806b and outputs the changing amount H. Namely, the changing amount H outputted from the subtracting means 802e becomes the maximum value of the instant values of the alternating electric current detecting signals Ia, Ib, Ic flowed by exceeding the limit output $I_{max}$, and is proportional to the peak value of the higher harmonic wave component included in the alternating electric current detecting signals Ia, Ib, Ic. Since the limit output $I_{max}$ is switched to $I_{max}1$ or $I_{max}2$, the limit output $I_{max}$ is switched as a result in accordance with the peak value of the higher harmonic wave component exceeding these limit outputs.

In the embodiment 5, the reactive current command limit signal $Id^*_{LIM}$ is limited by the limit value $Id^*S$ corresponding to the limit output $I_{max}2$ when the changing amount H is large. In contrast to this, when the changing amount H is small, the reactive current command limit signal $Id^*_{LIM}$ is limited by the limit value $Id^*L$ corresponding to the limit output $I_{max}1$. In this embodiment 5, the reactive current command limit signal $Id^*_{LIM}$ is more greatly limited and the electric power converting circuit 1 is operated by setting $I_{max}1>I_{max}2$ only when the changing amount H is large. Even when the fundamental wave of the alternating voltage in the alternating-current power system 2 is reduced and the higher harmonic wave component is flowed to the alternating-current power system 2, the electric power converting circuit 1 is operated and the reactive power compensation can be continued such that each power switching element of the electric power converting circuit 1 does not exceed a controllable electric current range.

Embodiment 6

Figure 7:
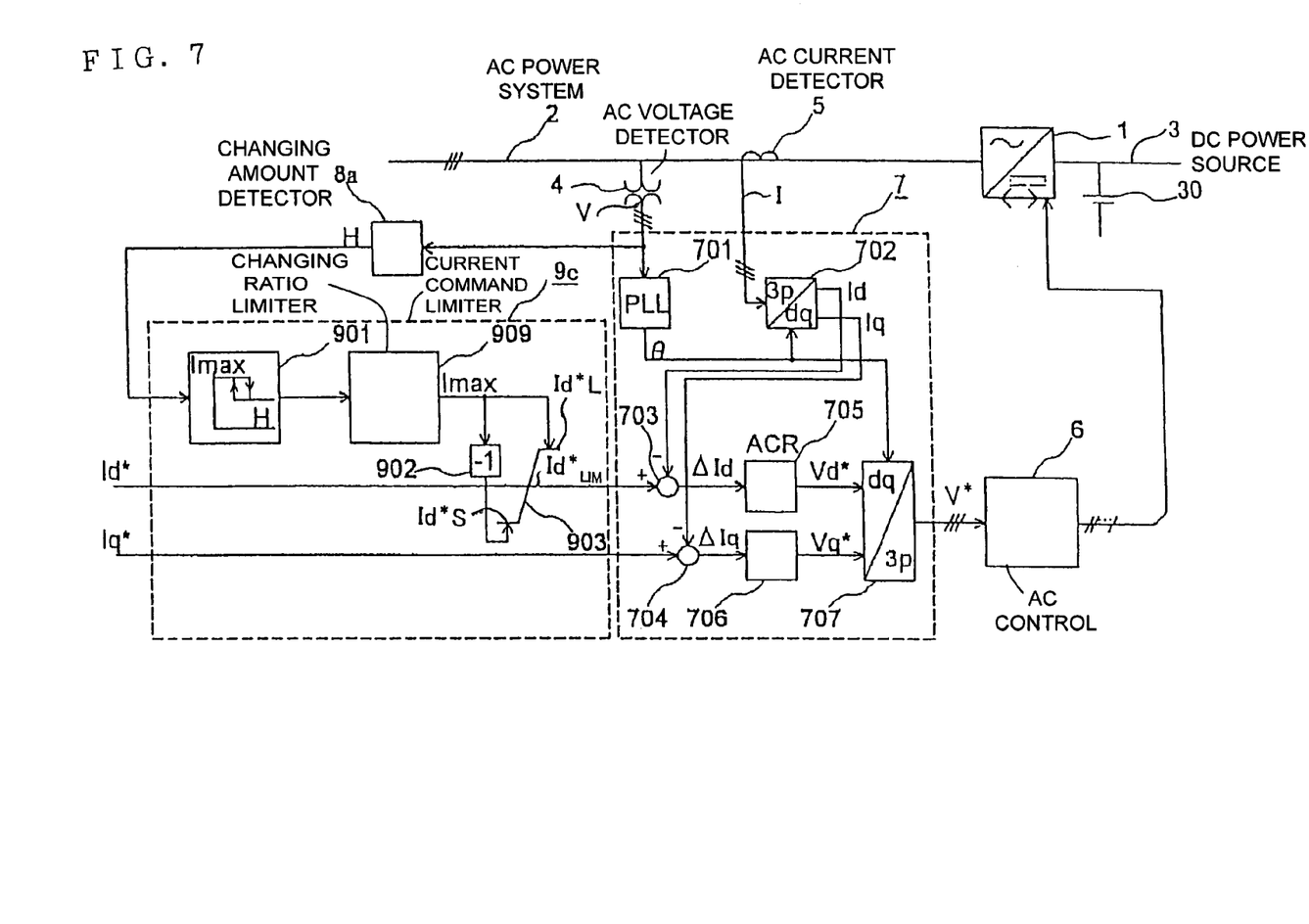
FIG. 7 is a block diagram showing an embodiment 6 of the reactive power compensator in this invention.

FIG. 7 is a block diagram showing an embodiment 6 of the reactive power compensator in this invention. In this embodiment 6, an electric current command limiting means $9c$ is used instead of the electric current command limiting means $9a$ used in the embodiment 1. In this electric current command limiting means $9c$, a changing ratio limiting means 909 is added between the limiting means 903 and the hysteresis comparator 901 in the electric current command limiting means $9a$ used in the embodiment mode 1. The other constructions are same as those of the embodiment 1.

When the output $I_{max}$ of the hysteresis comparator 901 is changed, the changing ratio limiting means 909 limits its time changing ratio. Concretely, the changing ratio limiting means 909 is characterized in the following construction. Namely, when the output $I_{max}$ of the hysteresis comparator 901 is changed from the first output value $I_{max}1$ to the second output value $I_{max}2$, no changing ratio limiting means 909 particularly limits the time changing ratio. The changing ratio limiting means 909 limits this time changing ratio only when the output $I_{max}$ is changed from $I_{max}2$ to $I_{max}1$.

When the output $I_{max}$ of the hysteresis comparator 901 is reduced from the first output value $I_{max}1$ to the second output value $I_{max}2$, no changing ratio limiting means 909 particularly limits the time changing ratio so that the output $I_{max}$ is rapidly changed for a short time from the first output value $I_{max}1$ to the second output value $I_{max}2$. In contrast to this, when this output $I_{max}$ is raised from the second output value $I_{max}2$ to the first output value $I_{max}1$, the time changing ratio is limited and the output $I_{max}$ is raised from the second output value $I_{max}2$ to the first output value $I_{max}1$ after a predetermined delay time has passed.

This changing ratio limiting means 909 prevents that the output $I_{max}$ is suddenly raised from the second output value $I_{max}2$ to the first output value $I_{max}1$. When the output $I_{max}$ is suddenly raised from the second output value $I_{max}2$ to the first output value $I_{max}1$, the alternating electric current in the alternating-current power system 2 is suddenly increased and there is a danger that the alternating-current power system 2 is unstabilized. However, the changing ratio limiting means 909 prevents such a danger.

Embodiment 7

Figure 8:
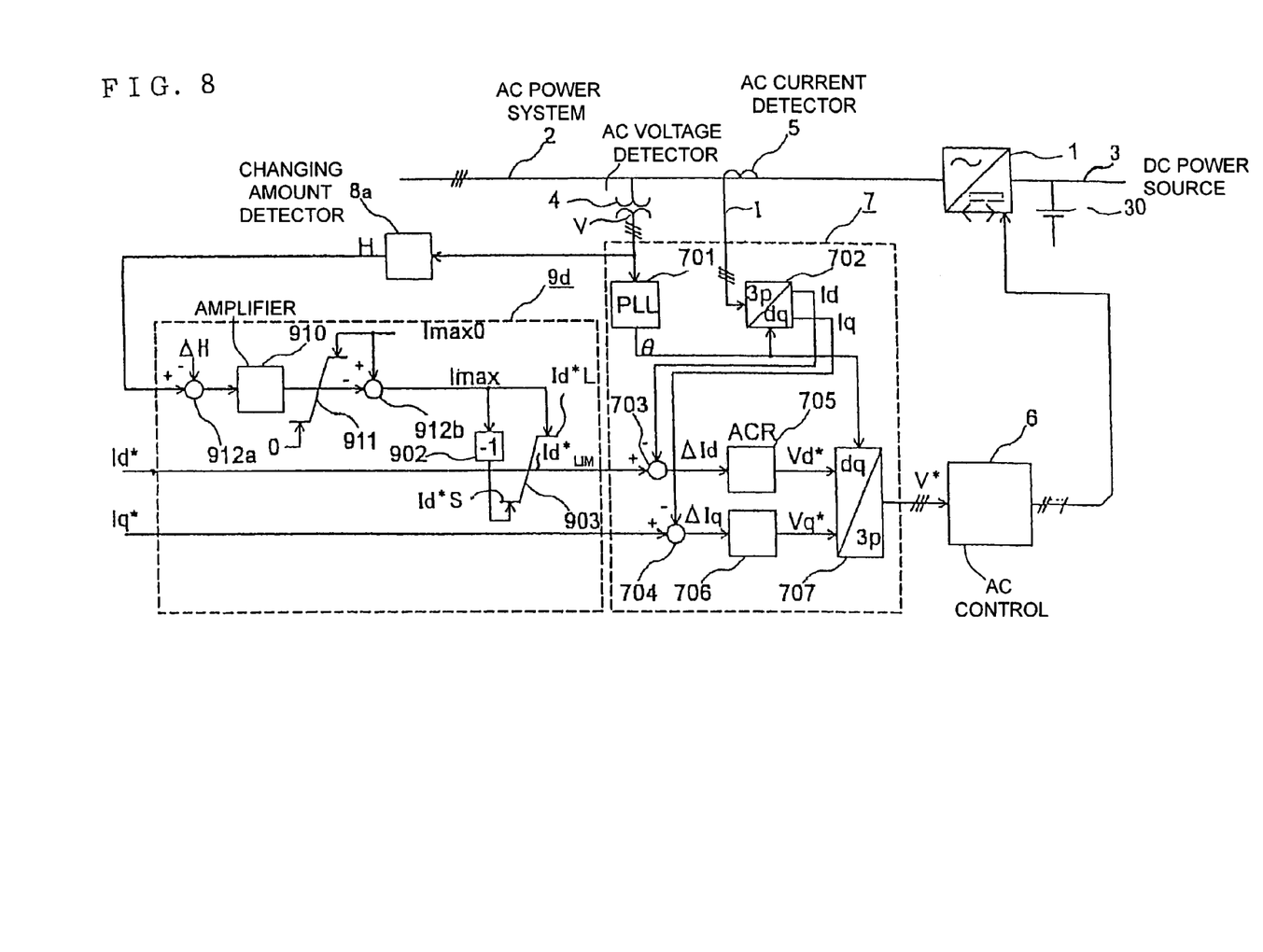
FIG. 8 is a block diagram showing an embodiment 7 of the reactive power compensator in this invention.

FIG. 8 is a block diagram showing an embodiment 7 of the reactive power compensator in this invention. In this embodiment 7, an electric current command limiting means $9d$ is used instead of the electric current command limiting means $9a$ used in the embodiment mode 1. The other constructions are same as those of the embodiment 1.

The electric current command limiting means $9d$ has a subtracting means 912a, an amplifying means 910, a limiting means 911, a subtracting means 912b, a multiplying means 902 and a limiting means 903. The multiplying means 902 and the limiting means 903 are the same means as the multiplying means and the limiting means used in the electric current command limiting means $9a$ of the embodiment 1.

The subtracting means 912a subtracts a predetermined value $\Delta H$ from the changing amount H, and supplies its subtracting output (H–$\Delta H$) to the amplifying means 910. The amplifying means 910 amplifies the subtracting output (H–$\Delta H$) of the subtracting means 912a, and supplies its amplifying output to the limiting means 911. The limiting means 911 limits its output to a value between an upper limit value $I_{max}0$ and a lower limit value 0. The subtracting means 912b subtracts the output of the limiting means 911 from the upper limit value $I_{max}0$ and supplies the limit output $I_{max}$ to the limiting means 903.

When the changing amount H is smaller than the predetermined value $\Delta H$, the output of the amplifying means 910 is 0 or negative and the output of the limiting means 911 is also 0. Accordingly, the limit output $I_{max}$ from the subtracting means 912b becomes the upper limit value $I_{max}0$ and the reactive current command limit signal Id*$_{LIM}$ is limited by the upper limit value Id*L.

When the changing amount H is increased and exceeds the predetermined value $\Delta H$, the output (H–$\Delta H$) of the amplifying means 910 and the limiting means 911 is increased in accordance with the changing amount H and the limit output $I_{max}$ of the subtracting means 912b is reduced in accordance with the changing amount H. Accordingly, a multiplying value provided by multiplying the limit output $I_{max}$ by (–1) in the multiplying means 902 is also reduced in accordance with the changing amount H. As its result, the reactive current command limit signal Id*$_{LIM}$ outputted from the limiting means 903 is reduced in accordance with the changing amount H. The reactive current deviation signal $\Delta$Id outputted from the subtracting means 703 of the control command means 7 is also reduced and the alternating-current power supplied from the electric power converting circuit 1 to the alternating-current power system 2 is reduced.

When the changing amount H is further increased and the subtracting output (H–$\Delta H$) of the subtracting means 912a exceeds the upper limit value $I_{max}0$, the subtracting output of the subtracting means 912b becomes 0 or less. A multiplying output provided by multiplying this subtracting output by (–1) in the multiplying means 902 also becomes –1 or less. Accordingly, the reactive current command limit signal Id*$_{LIM}$ using the limiting means 903 becomes the lower limit value Id*S and is limited by this lower limit value Id*S. The fundamental wave component of the alternating voltage supplied from the electric power converting circuit 1 to the alternating-current power system 2 is limited by the lower limit value Id*S. Thereafter, if the changing amount H is reduced, the reactive current command limit signal Id*$_{LIM}$ is increased. As the reactive current command limit signal Id*$_{LIM}$ is increased, the fundamental wave component of the alternating voltage from the electric power converting circuit 1 to the alternating-current power system 2 is also increased.

Thus, in the embodiment 7, even when the higher harmonic wave component in the alternating-current power system 2 is increased, the reactive power compensation using the electric power converting circuit 1 can be continued by controlling the limit value of the reactive current command limit signal Id*$_{LIM}$ in accordance with the magnitude of the changing amount H while the operation of the power switching element is controlled.

The reactive power compensator in this invention compensates the reactive power with respect to the alternating-current power system and is connected to the alternating-current power system and is utilized.

What is claimed is:

1. A reactive power compensator comprising:
   an electric power converting circuit connected to an alternating-current power system and a direct current power source circuit, converting direct current voltage from the direct current power source circuit to an alternating voltage by switching, and supplying the alternating voltage to the alternating-current power system;

alternating voltage detecting means for outputting an alternating voltage detecting signal representing the alternating voltage in the alternating-current power system;

alternating electric current detecting means for outputting an alternating electric current detecting signal representing an alternating electric current in the alternating-current power system;

control command means for receiving an electric current command signal and outputting an alternating voltage command signal in accordance with the electric current command signal, the alternating voltage detecting signal, and the alternating electric current detecting signal;

alternating voltage control means for controlling the switching of said electric power converting circuit in accordance with the alternating voltage command signal;

changing amount detecting means for outputting a changing amount representing a change of an alternating current electric amount of one of the alternating voltage and the alternating electric current in the alternating-current power system based on the alternating current electric amount; and limiting means for limiting the electric current command signal, wherein said limiting means limits the electric current command signal based on the changing amount.

2. The reactive power compensator according to claim 1, wherein the changing amount is changed in accordance with a higher harmonic wave component included in the alternating current electric amount.

3. The reactive power compensator according to claim 2, wherein the alternating-current power system has three phases, the alternating current electric amount is set to a three-phase alternating current electric amount, and the changing amount is changed to follow a maximum value of the higher harmonic wave component included in the alternating current electric amount of each phase.

4. The reactive power compensator according to claim 2, wherein the changing amount is changed in accordance with a specific higher harmonic wave component included in the alternating current electric amount.

5. The reactive power compensator according to claim 1, wherein the changing amount is changed in accordance with instantaneous value of the alternating current electric amount.

6. The reactive power compensator according to claim 5, wherein the changing amount is changed to follow a peak value of the alternating current electric amount.

7. The reactive power compensator according to claim 1, wherein said changing amount detecting means outputs the changing amount based on the alternating current electric amount and a limit value of the electric current command signal using said limiting means.

8. The reactive power compensator according to claim 7, wherein the changing amount detecting means outputs the changing amount based on the difference between the alternating current electric amount and the limit value of the electric current command signal, using said limiting means.

9. The reactive power compensator according to claim 1, wherein said limiting means reduces a limit value with respect to the electric current command signal when the changing amount exceeds a predetermined value.

10. The reactive power compensator according to claim 9, wherein said limiting means reduces the limit value with respect to the electric current command signal when the changing amount exceeds a first predetermined value, and increases the limit value with respect to the electric current command signal when the changing amount becomes smaller than a second predetermined value.

11. The reactive power compensator according to claim 10, wherein said limiting means sets the electric current command signal to a lower limit value when the changing amount exceeds the first predetermined value, and sets the electric power command signal to an upper limit value when the changing amount becomes smaller than the second predetermined value.

12. The reactive power compensator according to claim 10, wherein a time changing ratio when increasing the limit value with respect to the electric current command signal is smaller than in the time changing ratio when decreasing the limit value with respect to the electric current command signal.

13. The reactive power compensator according to claim 1, wherein the electric current command signal includes a reactive current command signal and an active current command signal, and said limiting means limits the reactive current command signal.

* * * * *